UNITED STATES PATENT OFFICE.

SAMUEL BLISS, OF CHICAGO, ILLINOIS.

IMPROVEMENT IN PROCESSES OF PRESERVING FISH, MEAT, &c.

Specification forming part of Letters Patent No. 205,830, dated July 9, 1878; application filed September 8, 1877.

*To all whom it may concern:*

Be it known that I, SAMUEL BLISS, of Chicago, in the county of Cook and State of Illinois, have invented a new and useful Improvement in Process for Preserving Fish, Meats, &c., which is fully set forth in the following specification.

The object of my invention is to provide a brine in which fish and meats may be preserved without becoming over-salted, as is usually the case.

The invention consists in the employment of glucose, in combination with common salt, in preparing a brine for preserving purposes.

The invention is intended for pickling purposes, and not for what is known as "dry-salting."

It is well known that in pickling fish and meats it is necessary to use so much salt in order to preserve the articles that they become over-salted, and are objectionable for use without freshening, and their flavor is also more or less injured. Ordinary sugar or cane-sugar is sometimes used to modify the action of the salt and to improve the flavor of the articles pickled; but this use of cane-sugar is ordinarily attended by fermentation, so that its use is objectionable, and, in fact, an absolute detriment, if it is desired to keep the fish or meat for any length of time.

It is well known that cane-sugar mixed with water will very soon produce fermentation; and the addition of common salt to this mixture does not prevent such fermentation. The only way in which the fermentation can be prevented is by keeping the pickle at a very low degree of temperature, which is practically impossible for ordinary commercial transactions, requiring shipments from one place to another, except at certain periods of the year; and therefore if cane-sugar is employed in the ordinary pickling process it is rendered practically useless for all seasons of the year.

I have found that if glucose is used with common salt in making the brine for pickling all these difficulties are obviated. The preservative effects of the glucose permit the quantity of salt necessary to be used to be greatly diminished, so that the meats or fish pickled in the brine will be only slightly salted. At the same time there is no fermentation, so that substances may be preserved in the brine for any length of time desired without change in the pickle. For this purpose I employ the ordinary glucose of commerce, which is a starch-sugar, and is understood to contain no nitrogen, and which combines chemically with common salt (chloride of sodium) to form a kind of double salt, the component parts of which are well known to chemists.

In carrying out my invention, I have found that seven pounds of glucose and seven to twelve pounds of common salt dissolved in five gallons of water will make a brine or pickle sufficient for one hundred pounds of fish. In preparing the pickle the glucose and water should first be united; and if it is desired to hasten the operation, a gentle heat may be applied. The salt is then added, when the chemical combination above described takes place.

Before the fish or meat is put in this brine it should be submitted to the operation which is generally known as "striking with salt"—that is, the fresh fish are laid open and sprinkled with salt, in which condition they are left for twelve hours. Meats before pickling are also submitted to substantially the same operation. The salt is then washed off, and the fish or meat packed in a suitable receptacle, covered with brine, and the receptacle closed, when the package is ready for shipment.

I have found this brine or pickle very desirable in preserving fish, which can be kept in it for a great length of time without becoming over-salted or materially losing its flavor. The fish, after it has remained in pickle for a long time, will be sweet, and will retain much of its original flavor, so as to make it much more palatable and desirable as an article of food than when pickled in the ordinary way.

The pickle is also suitable for preserving meats either raw or cooked, and the fish or meats may be packed in barrels, casks, cans, or any other suitable receptacle.

I do not, however, limit myself to the precise proportions of the ingredients named above, for they may be varied somewhat with departing from the nature of my invention.

I have described above one method of carrying out this invention; but I do not limit myself to this particular method, as it may be modified to suit special circumstances, as required, my object being to include in my invention any combination of glucose with common salt to form a preservative compound.

Having thus described my invention, what I claim as new, and desire to secure by Letters Patent, is—

1. A brine or composition for preserving fish, meat, &c., consisting of a solution of starch-sugar or glucose and common salt, in substantially the proportions described.

2. The herein-described process for preserving fish, meat, &c., consisting in first striking with salt and then packing in a pickle or brine composed of a solution of starch-sugar or glucose and common salt, substantially as and for the purpose set forth.

SAMUEL BLISS.

Witnesses:
   JNO. C. MACGREGOR,
   L. A. BUNTING.